May 15, 1956     I. V. ZOZULIN ET AL     2,745,975
CENTRIFUGALLY CONTROLLED MAGNETIC COUPLINGS
Filed July 27, 1953
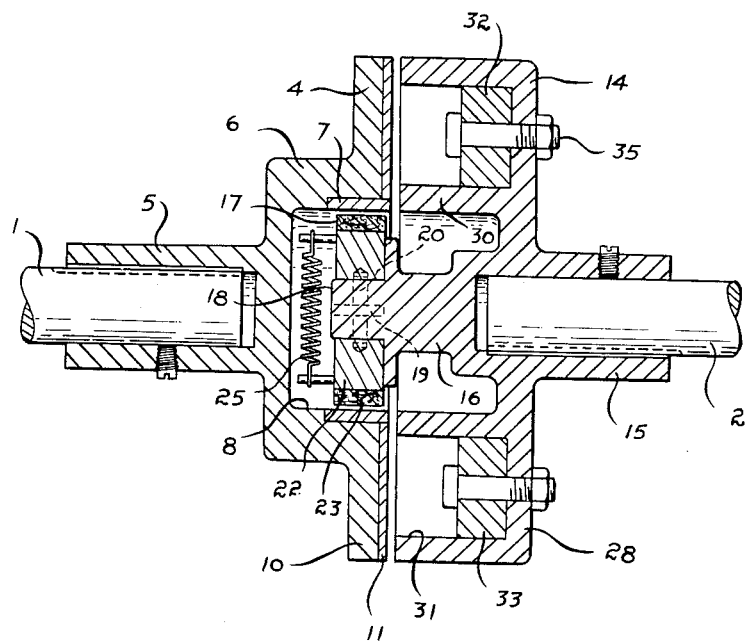
INVENTORS
IGOR V. ZOZULIN
GEORGE J. OKULITCH
ALEC S.J. ELLETT.
*Ernest E Carver*
ATTORNEY United States Patent Office 2,745,975
Patented May 15, 1956

2,745,975
CENTRIFUGALLY CONTROLLED MAGNETIC COUPLINGS

Igor V. Zozulin, George J. Okulitch, and Alec S. J. Ellett, Vancouver, British Columbia, Canada, assignors to Magnetorque Couplings Limited, Vancouver, British Columbia, Canada Application July 27, 1953, Serial No. 370,586

1 Claim. (Cl. 310—100)

Our invention relates to improvements in centrifugally controlled magnetic couplings.

The object of the present invention is to incorporate a positive drive mechanism in a magnetic coupling so that when the driven shaft has been brought up to substantially the speed of the drive shaft, said shafts will be automatically coupled to provide a positive drive. The advantages of the coupling are that the generation of heat by the constant cutting of magnetic lines of force ceases as soon as the coupling ceases to slip and becomes positive. It also provides that no wear on frictional elements takes place during the initial pick up of the load and that the substantially heavy wear on such elements is of short duration and takes place only when the load shaft is approaching maximum of drive shaft speed. The loss of power which usually takes place in a magnetic clutch through conversion to heat is relatively high and becomes constant when the load shaft reaches its ultimate speed, but in the coupling here to be described, this heat loss develops only during the time that slip is occurring in the transmission and the magnetic elements are free to dissipate their heat immediately following the attainment of equal speed of the drive and driven shafts, so that the energy normally lost in the generation of heat under load is no longer required and the normal full load requirement can be provided with a much smaller motor than that necessary to drive the load constantly through the conventional magnetic coupling. In other words, with our improved clutch a load substantially equal to the rated capacity of a given motor can be started, brought up to speed and maintained at speed indefinitely by overloading the motor within its normal overload capacity during the starting period only. A still further advantage of the use of the invention in driving such devices as large separators and the like, is that the load can be brought up to speed without vibration more rapidly if desired and without wear on frictional elements with a motor of much smaller capacity than that which is usually employed in driving the device through a centrifugal or a magnetic clutch.

The drawing is a longitudinal view and illustrates the invention in its simplest form showing conventional elements of a permanent magnet coupling and conventional parts of a centrifugal coupling, either of which may be varied according to the requirements of the drive to be transmitted.

The numerals 1 and 2 indicate aligned input and output shafts respectively and are presumed to be the drive of a motor, not shown, and the driven or load shaft respectively. Fitted to the drive shaft 1 is a drive rotor 4 having a hub 5 supporting a cylindrical casing 6 having a liner 7 non-rotatively carried on its inner peripheral wall 8. Extending from the outer periphery of the casing is a rotor flange 10 which may be faced with an annular ring 11 of copper, aluminum or other non-magnetic material. The rotor flange 10 is of magnetic material when faced with a non-magnetic material as here shown, but may be of any material desired if the facing material is or contains in part magnetic material.

Fitted to the shaft 2 is a driven rotor 14 having a hub 15 enclosing the end of the shaft and terminating in a stub shaft 16 which supports a centrifugal coupling element 17. The coupling element 17 consists of a boss 18 having radially projecting wings 19 which support pairs of guide pins 20. A pair of clutch shoes 22 fitted on their outer periphery with brake lining material 23 are slidably mounted upon the guide pins 20 to engage the liner 7 when the shoes are forced radially outward by centrifugal force and which are retracted toward each other by a spring 25 when rotation of the shaft 2 drops below a predetermined speed.

The hub 15 is provided with a flange 28 having a pair of concentric spaced annular ribs 30 defining a groove 31 in which an annular row 32 of horseshoe magnets 33 are mounted, which magnets are housed within the groove 31 and are held in position therein with bolts 35 or by any other suitable means. The flange 28 and the annular ribs are preferably of plastic or any other non-metallic material, so that the lines of force will flow from one pole to another through the annular ring 11, or the rotor flange 10, according to their magnetic permeability.

In operation, when the driving motor is started the input or drive shaft 1 will quickly step up to normal running speed, causing initial repulsion to the magnets 33 followed by a drag between the drive rotor 4 and the driven rotor 14 which will cause it to rotate slowly. As the rotation of the rotor 14 and its row of magnets 32 increases so will the attraction of the magnets increase until said rotor is turning with a minimum slip relative to the rotor 4. As the rotor 14 approaches the point of minimum slip the coupling element 17 will start to engage the liner 7 of the casing 6, thus rapidly decreasing the slip between the rotors 4 and 14 until the coupling element and the rotor 4 become fully engaged when the speed of rotation of both of said elements will be equal and the magnetic drag which initiated rotation of the rotor 14 from the rotor 4 will cease. In consequence of this elimination of drag the generation of heat will cease and the power loss normally incidental to such heating will be entirely overcome, so that the current consumed will be entirely utilized in driving the output shaft from the input shaft through the centrifugal coupling element 17 and the liner 7.

What we claim as our invention:

A centrifugally controlled magnetic coupling comprising two separate rotors, said rotors being adapted for mounting upon a pair of substantially aligned shafts, one rotor having a cylindrical recess having a frictional lining and a flange of magnetic permeability surrounding the cylindrical recess, the second of said rotors having permanent magnets concentrically arranged to oppose the flange of the first rotor and a centrifugal clutching element adapted to be inserted into the cylindrical recess whereby on a given rotational speed being imparted to the first rotor by the magnets the clutching elements will engage the frictional lining of the first-mentioned rotor, there being no mechanical connection between the two rotors prior to the engagement of the frictional lining by the clutching element.

References Cited in the file of this patent
UNITED STATES PATENTS

| 1,261,594 | Morrison | April 2, 1918 |
| 1,303,291 | Goldberg | May 13, 1919 |
| 1,451,465 | Neuland | Apr. 10, 1923 |
| 1,601,001 | Sleeper | Sept. 28, 1926 |